May 9, 1961  G. E. BOMBARGER  2,983,400
FISH BOX OR THE LIKE
Filed Nov. 15, 1957  3 Sheets-Sheet 1
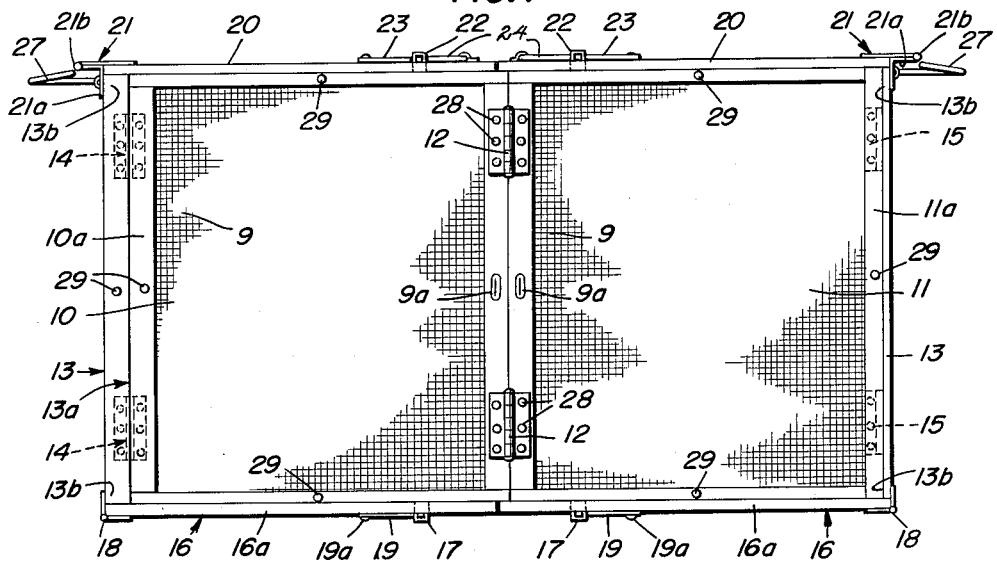
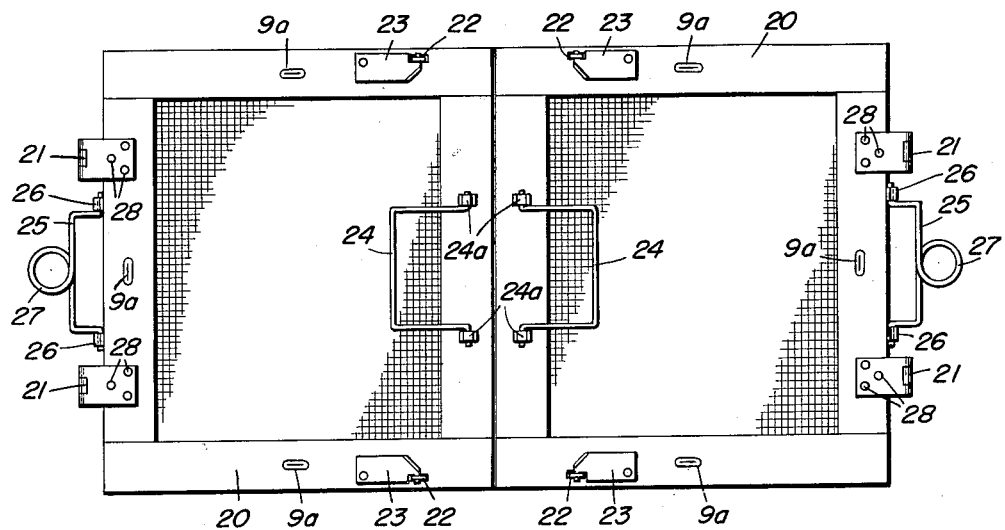
INVENTOR
Glen E. Bombarger
BY Eugene E. Stevens
Eugene E. Stevens III
ATTORNEYS May 9, 1961     G. E. BOMBARGER     2,983,400
FISH BOX OR THE LIKE Filed Nov. 15, 1957     3 Sheets-Sheet 2

INVENTOR
Glen E. Bombarger

BY Eugene E. Stevens
Eugene E. Stevens III
ATTORNEYS

May 9, 1961  G. E. BOMBARGER  2,983,400
FISH BOX OR THE LIKE
Filed Nov. 15, 1957  3 Sheets-Sheet 3
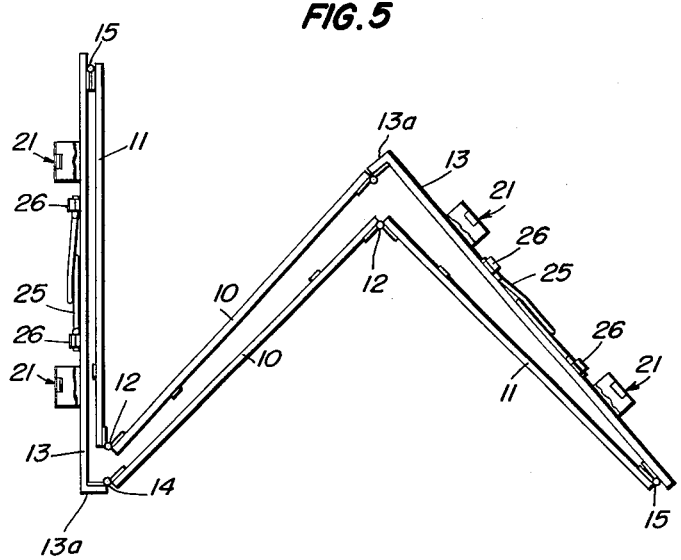
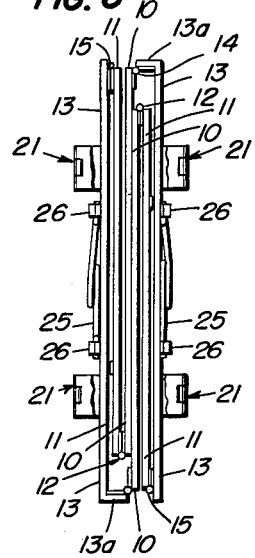
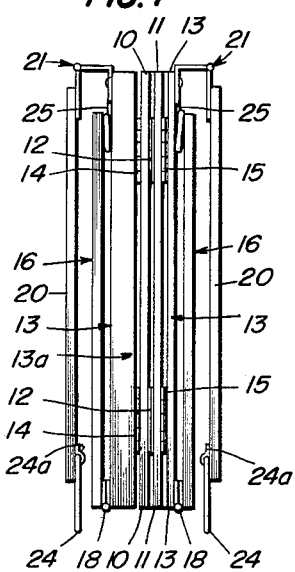
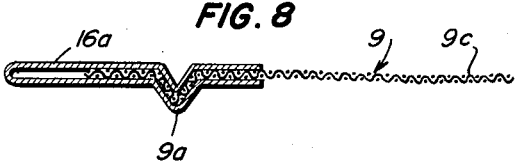
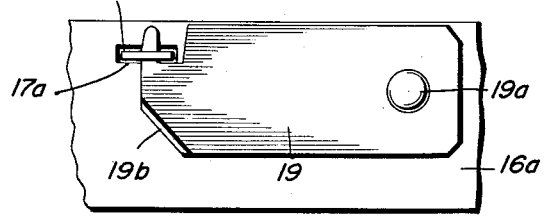
INVENTOR
Glen E. Bombarger
BY
ATTORNEYS.

United States Patent Office 2,983,400
Patented May 9, 1961

2,983,400
FISH BOX OR THE LIKE
Glen E. Bombarger, Rte. 2, Box 762, Muskego, Wis.
Filed Nov. 15, 1957, Ser. No. 696,729
1 Claim. (Cl. 220—7)

My invention relates to collapsible boxes and especially such as are used by fishermen to provide safe storage for live fish, minnows, crabs and the like.

Briefly and generally stated, the invention has for its primary object to improve upon the box of my Patent No. 2,661,116, dated December 1, 1953, by providing a fish box or the like which is sturdier, cheaper to manufacture, and more practical than my patented box; and which may, if desired, be sold in knockdown form to be assembled by the purchaser in accordance with the presently popular "do-it-yourself" vogue.

It is also an object of the invention to provide novel plate form latch means for holding the box set up for use and which latch means may be formed as a stamping to provide at its free end a laterally extending bill at one edge and an operating finger piece at the opposite edge, the said finger piece extending diagonally of the longitudinal axis of the latch so that substantial force can be applied to the latch in both a latching and unlatching direction without finger discomfort.

Another object of the invention is to provide novel and sturdy load-supporting means for securing such as box top or bottom providing members in assembly with adjacent parts, and for retaining the box "set up" and against collapse.

A further object is to furnish, in a box of the class indicated, end wall-carried handles having means for the ready attachment of a line for use when lowering the unit into or withdrawing it from the water, the arrangement of such handles being such as not to interfere with the folding of the box into a compact unit for transport or storage.

A further object of the invention is to so construct the box that upon folding, the same can be collapsed into a relatively small area, the two bottom halves being folded to lie against the opposite ends of the box, the bottom halves being confined within the two top halves, and the handles on the top halves serving as carrying means for the collapsed box.

A further object of the invention is to provide the pivot means for at least two diametrically opposite corners to be spaced away from the corners, that is, along the opposite sides of the box, and further having the opposite pivots of the respective side sections spaced out of line with each other, such pivoting means providing in the collapsing of the box, means wherein one section of each side moves to position adjacent each one of the end sections, and the other of the two side sections moving in a position parallel to each other.

Invention also resides in certain other novel features of construction, combination and arrangement of parts, as will be apparent to those versed in the art, reference being had to the accompanying drawings which illustrate a now-preferred form of the invention. It is to be understood, however, that the invention is susceptible of other mechanical expression within the spirit and scope of the subject matter claimed hereinafter.

Referring to the drawings wherein the same reference characters have been employed to designate the same parts wherever they appear throughout the several views—

Fig. 1 is a side elevation of a fish box or the like embodying my invention;

Fig. 2 is a top plan view thereof;

Fig. 5 is a view similar to Fig. 4 but showing the side walls partially collapsed in the process of folding same between the end members as a compact unit, as shown in Fig. 6;

Fig. 6 is a top plan view as in Figs. 4 and 5 with the top and bottom-providing members deleted and showing the side wall members of the box folded against one another and housed between the end wall providing members of the box;

Fig. 7 is a side elevational view of the complete folded box and illustrating the top and bottom-providing members disposed outwardly of the end wall providing members with the end wall providing members located just inwardly of the adjacent top-providing members;

Fig. 8 is a detail sectional view showing the novel crimp means for securing the hardware cloth and/or protective wire mesh to the frame portions of the wall members of the box;

Fig. 9 is a detail top plan view of one of the top and bottom members securing latches.

Figure 3:
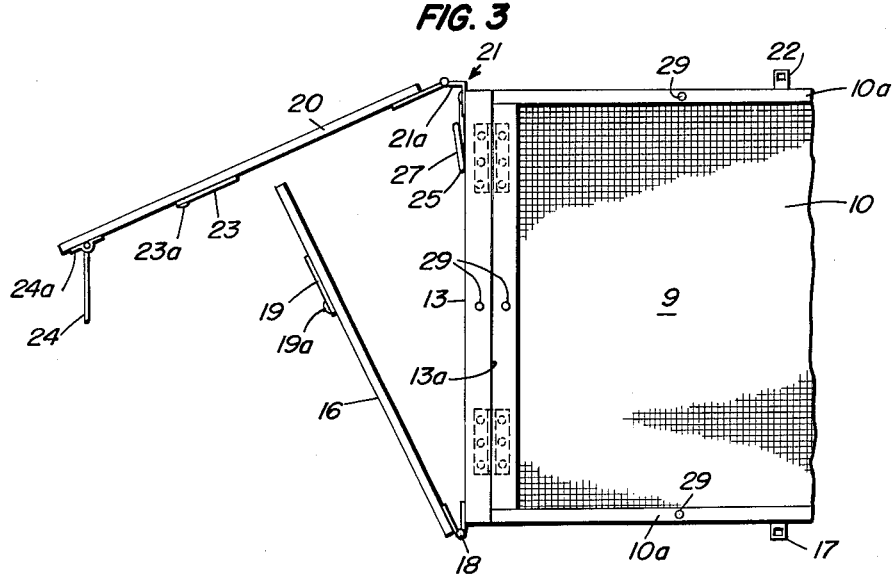
Fig. 3 is a fragmentary side elevation showing how the top and bottom-providing members at one end are folded preparatory to collapse of the box into a compact folded unit for transport or storage.

Referring to the drawings by reference characters, each of the side walls of the box is provided by hingedly connected wall sections 10, 11 which comprise the rectangular frames 10a, 11a and carry the hardware cloth or other mesh material 9, as indicated.

As shown in Fig. 1, the adjacent upstanding rail portions of the side section frames 10a, 11a are exteriorly hinged together by butt-type hinges as indicated at 12. The outer ends of the side-providing sections 10, 11 are hinged as at 14, 15 to the end sections 13, it being noted that each end section 13 is L-shaped in cross-section at one side, to provide the inwardly extending flange 13a as a side wall extension. This flange 13a carries one leaf of the adjacent side wall-connecting hinge 14. The reason for the inwardly extending end section-provided flanges 13a will be explained later on herein. The frames 13b of the end sections carry hardware cloth 9 or other mesh material.

The box bottom is provided by two sections 16 which are coextensive in width with the box and are hinged as at 18 to the bottom rail of the end member frames 13b. The bottom sections 16 are of frame form as indicated at 16a to carry hardware cloth 9 and have their inner ends closely adjacent one another as indicated in Fig. 1. Each of the bottom sections 16 is secured in operative bottom-forming position by means of two latch members 19 which are pivoted as at 19a to opposite side rail portions of the bottom member frames 16a, and engage eye-providing studs 17. These studs 17 are functionally integral with the adjacent side member frames 10a, 11a and project through holes 17a in the side rails of the related bottom member frame so as to cooperate with the bottom wall sections 16 to prevent shifting of side walls 10, 11.

It will be understood that since the studs 17 are functionally integral with the related side member frames 10a, 11a, and the sturdy substantially rectangular stamping-provided latches 19 make flat contact with the related rail, a very effective load-supporting connection for bottom sections 16 is provided, as indicated in the detail view, Fig. 9.

One corner of the free end of latch 19 has the cut-out provided bill, as shown, and the other free-end-provided corner of each latch 19 is diagonally turned up as indicated at 19b to provide a finger piece whereby the latch can be readily swung about its pivot 19a and considerable force applied without finger discomfort.

As in the case of the box bottom 16, 16, the top is provided by two inwardly swingable sections 20 which are pivoted to the top rail frame portions 13b of the end members 13 by butt-type hinges 21. The hinge leaf 21a of each hinge which is attached to the adjacent end wall 13 is L-form as shown, so as to dispose the pintle 21b outwardly of the related end section. The reason for this will be explained later on. The box top-providing sections 20 are secured in place by latches 23 which are identical with the latches 19 previously described, and engage eye-providing lugs 22. These lugs 22 are functionally integral with the top rail portions of the related side member frames 10a, 11a, and extend through holes in the related top member portions 20. Thus lugs 22 function with top sections 20 to prevent shifting of the side wall sections 10, 11.

It should be noted here that the frames of the side end, bottom, and top members 10, 11, 13, 16, 20, respectively, are formed of doubled back sheet metal or like strips to provide inwardly extending entry spaces for the hardware cloth or the like 9. Thus the frame members can be crimped as shown at 9a in Fig. 8 to retain the hardware cloth in place. In the case of the bottom sections 16, I provide, as shown in Fig. 8, a protective crimp-retained sheet of heavy wire mesh 9c exteriorly of the hardware cloth 9.

Adjacent their meeting ends, the top members 20 carry the handles 24 which are secured to bearings 24a which are fastened to the top members 20 adjacent the meeting ends thereof. These handles 24 admit of the box being readily carried in set-up form, and also in its folded form, shown in Fig. 7.

Each end of the box carries an additional handle 25 which is pivoted at 26 to the related end wall frame 13b adjacent the top thereof, each of these handles 26 providing an intermediate loop 27 for a rope of cord by which the box can be lowered into or pulled out of the water. It will be understood that when the box is to be folded, the handles 26 will depend down against the exterior surface of the adjacent end wall 13 so as to be out of the way.

When the box is to be collapsed or folded, as in Fig. 7, for storage or transport the first step is to unfasten the top and bottom section-securing latches 19, from their respective lugs 17, 22. This having been done, the bottom wall sections 20, 16 are swung outwardly clear of lugs 19 as suggested in Fig. 3 to lie against the exterior surfaces of the end providing sections 13. Then when top latches 23 have been unfastened from the studs or lugs 22 the top sections 20 are folded down to overlie the upwardly folded bottom section 16, as indicated in Fig. 7. The reason for the outwardly offset pintles 21b of hinges 21 is to admit of the bottom sections 16 being folded upwardly into place inwardly of said pintles, as indicated in Figs. 3 and 7.

Figure 4:
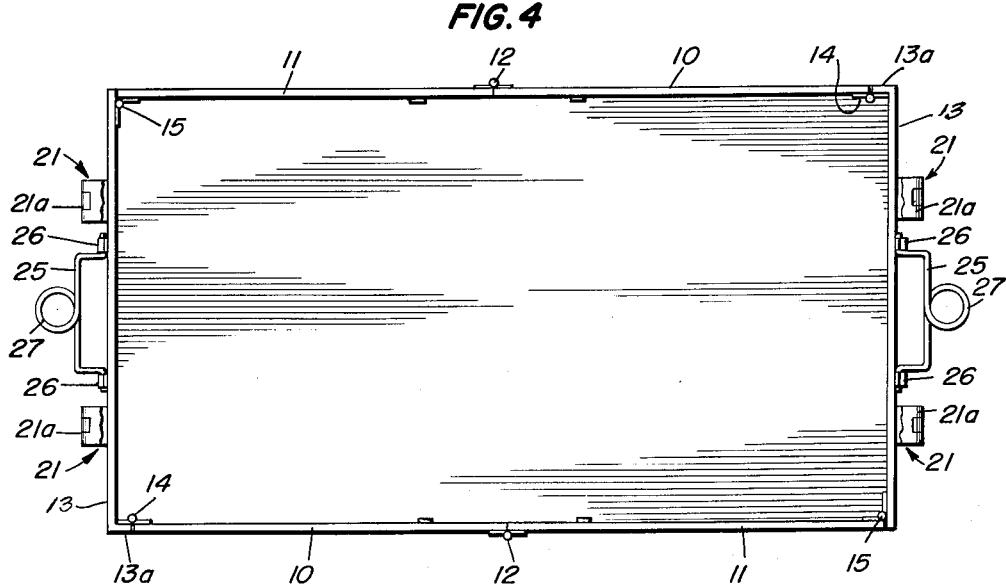
Fig. 4 is a top plan view showing the side and end wall members only of the box preparatory to the folding of the sides, the top and bottom-providing portions having been deleted for the sake of clarity.

When the top and bottom sections 20, 16 have been folded as suggested in Fig. 3 and as indicated in Fig. 7, the side sections 10, 11 are free to shift and the box will conform diagrammatically to the disclosure in Fig. 4 which omits said top and bottom sections 16, 20. Now the opposed side-providing sections 10 are swung inwardly, or to the left as seen in Figs. 4 and 5, with the result that the rightmost end section 13 and side sections 10, 11 shift as indicated in Fig. 5 to the positions shown in Fig. 6. As will be seen in Fig. 6, hinges 12, 14 have approached one another as have also the adjacent side wall sections 10, 11. One side wall section 10 is adjacent and inwardly of one end section 13 and the unrelated side wall section 11 is located adjacent and inwardly of the other end wall section 13. The inwardly extending bottom wall sections 16 lie exteriorly of the related end walls 13 and inwardly of the depending top wall sections, all as shown in Fig. 6. The top section-carried handles 24 extend beyond the folded structure and provide a convenient means for carrying it. Since the end wall-carried handles 26 fold inwardly, as earlier noted herein, they do not interfere with the compact folding of the box as shown in Fig. 6.

The end wall-provided flanges 13a which are aligned with adjacent side wall sections 10 (or 11) combine with side wall connecting pivots 12—which, as shown in Fig. 4, are offset longitudinally of the box—to admit the compact folding of the unit as shown in Figs. 6 and 7 with all sections in parallelism.

It is further to be noted in respect to the exteriorly mounted butt type side wall section-connecting hinges 12, that they cooperate with the substantially meeting side wall sections 10, 11 to prevent any appreciable outward swinging of the latter. This adds to the "set-up" rigidity of the box by relieving the latch and stud retainers 19, 17 and 23, 22 of the strain of any forces tending to swing side sections 10, 11 outwardly.

In lieu of the crimping 9a the screen material 9 may be secured in place by spot welding. Also when the unit is sold in knockdown form to be assembled by the purchaser, screening will be conveniently retained in place at least at certain frame portions by the hinge leaf mounting screws or the like 28 secured in preformed frame holes and by readily applied rivets 29 projected through other preformed frame holes.

Having described my invention what I claim is:

In a collapsible fish box or the like providing a single frame form end wall-defining section at each end, the sides of the box formed by duplicate frame form wall sections substantially coextensive in height with said end sections and vertically hinged to the latter and to one another, the respective box top and bottom walls being each defined by duplicate frame form sections which are coextensive in width with said end sections and which are horizontally hinged to the latter, and there being screen material panels closing the spaces defined by each of said frame form walls and carried by the latter, there being functionally integral transversely and outwardly extending lugs having transverse apertures adjacent their outer ends, said lugs carried by the top and bottom portions of each of the side wall sections and coplanar therewith, the top and bottom wall sections having holes through which said lugs extend whereby to prevent relative shifting of the side sections when the one or the other or both of the pairs of top and bottom wall sections are in operative position; the improvement which comprises substantially rectangular plate-form latches vertically pivoted to the respective top and bottom sections for horizontal movement in contact therewith, the free ends of said latches providing corners, a laterally extending cutout-provided bill at one free end provided corner of each latch and engageable through the aperture of an adjacent one of said lugs when the latter is projected through the hole in the latch-carrying section, and the other corner of said free latch end being turned out normal to the main latch body on a line diagonal to the latch axis to constitute a finger piece of latch stock thickness which extends diagonally of the latch axis and thus enables substantial pressure to be applied to the latch in both a latching and unlatching direction without finger discomfort.

References Cited in the file of this patent
UNITED STATES PATENTS

| | | |
|---|---|---|
| 683,020 | Camp | Sept. 24, 1901 |
| 900,162 | Goodwin | Oct. 6, 1908 |
| 1,018,378 | Schleier | Feb. 20, 1912 |
| 1,032,622 | Olson et al. | July 16, 1912 |
| 1,180,294 | Hunter | Apr. 25, 1916 |
| 1,648,045 | Eitsert | Nov. 8, 1927 |
| 1,661,161 | Beougher | Mar. 6, 1928 |
| 2,283,488 | Cox | May 19, 1942 |
| 2,517,178 | Cheatham | Aug. 1, 1950 |
| 2,661,116 | Bombarger | Dec. 1, 1953 |
| 2,720,996 | Anderson | Oct. 18, 1955 |
| 2,803,084 | Frerking | Aug. 20, 1957 |